Feb. 18, 1930.  R. C. MORRIS  1,747,641
JUICE EXTRACTOR
Filed July 7, 1928
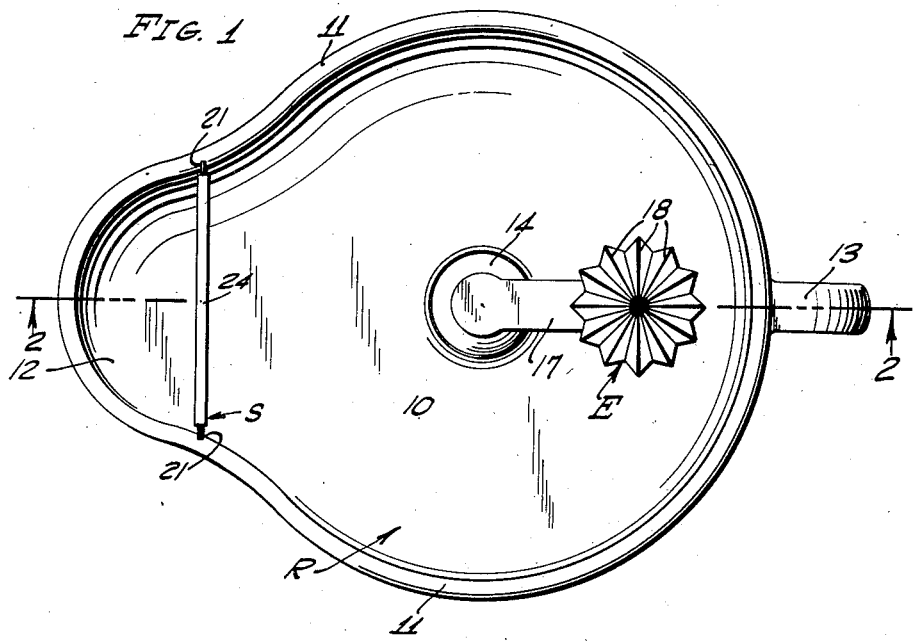
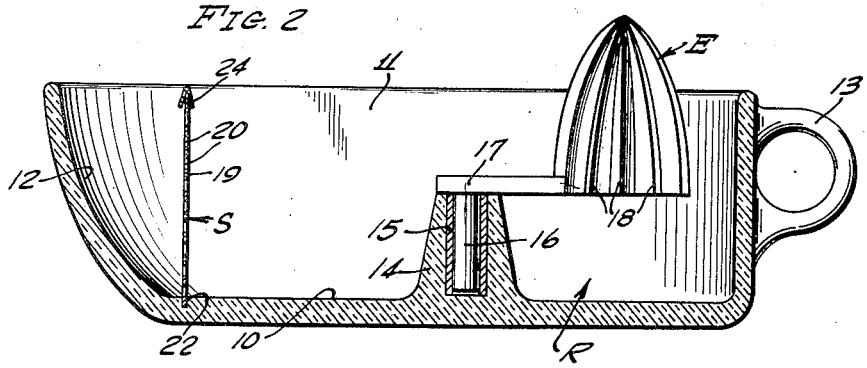
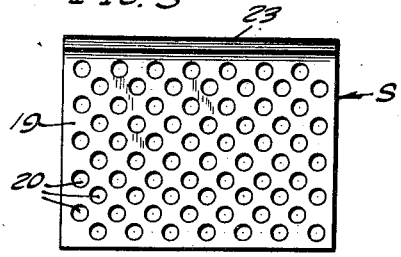
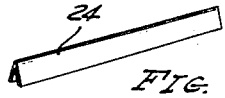
INVENTOR
ROBERT C. MORRIS
BY Munn & Co.
ATTORNEYS Patented Feb. 18, 1930

1,747,641

UNITED STATES PATENT OFFICE

ROBERT C. MORRIS, OF UPLAND, CALIFORNIA

JUICE EXTRACTOR

Application filed July 7, 1928. Serial No. 291,058.

My invention relates to and has for a purpose the provision of an extremely simple, substantial, and inexpensive device by which the juice and pulp of fruits such as oranges, lemons, and limes, for example, can be extracted therefrom with the utmost ease and dispatch.

It is a further purpose of my invention to provide a juice extractor embodying an extracting element or head mounted for movement bodily in a predetermined path and caused to move relatively to a piece of fruit held thereagainst during bodily movement of the element so that the latter will thus extract the juice and pulp from the fruit.

It is another purpose of my invention to provide a juice extractor of the above described character embodying a receptacle in which the extracted juice and pulp is collected and the juice strained from the pulp before being discharged from the receptacle, the extractor also embodying a cutting element by which a piece of fruit can be divided into sections for subsequent extraction of the juice and pulp therefrom.

I will describe only one form of juice extractor embodying my invention, and will then point out the novel features thereof in claims.

In the accompanying drawing,

Fig. 1 is a view showing in plan one form of juice extractor embodying my invention;

Fig. 2 is a vertical sectional view taken on the line 2—2 of Fig. 1 and looking in the direction of the arrows;

Fig. 3 is a detail view of a combined straining and cutting element embodied in the extractor; and Fig. 4 is a detail perspective view of a cutting edge protector embodied in the extractor.

Referring specifically to the drawing in which similar reference characters designate similar parts in each of the several views, my invention in its present embodiment comprises a receptacle designated generally at R, of substantially circular form, constructed of vitreous material or metal and having a flat bottom 10, and a vertical side wall 11 so as to form a bowl. One side of the receptacle is extended to provide a spout 12, and diametrically opposite to the spout the receptacle is provided with a handle 13.

Rising centrally from the bottom wall 10 of the receptacle is a tubular standard 14; and in the event that the receptacle is formed of vitreous material, a metal sleeve 15 is cemented or otherwise secured in the bore of the standard to provide a journal in which a stub shaft 16 formed on an arm 17 is rotatably mounted.

Formed integral with or otherwise fixedly secured to the free end portion of the arm 17 is an extractor element or head designated generally at E and in the present instance comprising a body of conoidal form having on its outer periphery a plurality of circumferentially spaced extracting projections in the form of ribs 18 which are co-extensive in length with the element and converge towards the apex of the latter.

The operation of the extractor is as follows:

A piece of fruit such as a half section of an orange or other citrus fruit is grasped in the hand of an operator and pressed downwardly upon the extractor element E and the latter simultaneously moved bodily. Through the medium of the arm 17 and its pivotal mounting in the bowl, the extractor element will be caused to travel bodily in a circular path concentric with the axis of the stub shaft 16. Due to the fact that the extractor element is fixed to the arm 17, it will be clear that as the element rotates bodily and with the piece of fruit held in the hand against turning, the element will rotate relatively to the piece of fruit a complete revolution for each revolution of the element bodily about the axis of the shaft 16, so that the ribs 18 will be caused to extract the juice and pulp from the fruit. It will be understood that in one aspect of my invention the arm 17 and its pivotal mounting in the bowl can be considered as broadly constituting a means for mounting the extractor element for movement bodily in a predetermined path (specifically a circular path about a fixed axis), and the fixed connection between the arm and the extractor element a means for causing the element when so moved bodily, to also move relatively to a piece of fruit held against the element, so that as a result, the juice and pulp will be extracted from the fruit.

The extracted juice and pulp in draining from the extractor element will collect in the receptacle R, and to permit the pulp to be strained from the juice and the latter separately poured from the spout 12, I provide a straining element S which in the present instance comprises a rectangular plate 19 of metal or other suitable material provided with a multiplicity of perforations 20 and slidably mounted at its side edges in channels 21 formed in the side wall 11 of the receptacle R substantially at the junction of the latter with the spout. The bottom edge of the plate seats in a channel 22 formed in the bottom wall 10 so that the plate completely spans the spout and will thus effectively separate the juice from the pulp.

The upper edge of the plate 19 is sharpened to provide a cutting edge 23 by which a piece of fruit can be conveniently divided into sections by pressing the fruit downwardly against the edge; and to prevent possible injury to the operator by the cutting edge when the extracting operation is being performed, the cutting edge is adapted to be covered by a protector in the form of a U shaped strip of metal 24 which is capable of being placed over the cutting edge as shown in Fig. 2 and is of sufficient length to cover the entire length of the cutting edge.

From the foregoing description it will be manifest that my invention broadly contemplates the provision of a suitable extractor element which is mounted for movement bodily, with a suitable means operable in response to bodily movement of the element, to cause the latter to move relatively to a piece of fruit held against the element while moving the latter bodily, with the result that the pulp and juice will be extracted from the fruit by the element, and that furthermore a suitable strainer may or may not be employed as desired, to separate the juice from the pulp as well as provide a means by which a piece of fruit can be divided into sections.

Furthermore, it will be apparent that the extracting operation can be performed with the utmost ease and dispatch by the simple expedient of merely pressing a section of fruit against the extractor element and simultaneously exerting force with the fruit upon the element in its direction of movement bodily on its mounting.

Although I have herein shown and described only one form of juice extractor embodying my invention, it is to be understood that various changes and modifications may be made therein without departing from the spirit of the invention and the spirit and scope of the appended claims.

I claim:

1. A juice extractor comprising a receptacle, an arm rotatably mounted in the receptacle, and an extractor head carried by the arm.

2. A juice extractor comprising a receptacle, an arm rotatably mounted in the receptacle, and an extractor head fixedly secured to the arm so as to travel bodily in a circular path in response to rotation of the arm.

3. A juice extractor comprising a bowl having a tubular standard therein, an arm having a stub shaft rotatably mounted in said standard, and an extractor head on the arm.

4. A juice extractor comprising a bowl having a spout, an extractor head in the bowl, and a straining element in the bowl in spanning relation to said spout, the straining element having a cutting edge by which a piece of fruit can be divided into sections.

5. A juice extractor comprising a bowl having a spout, an extractor head in the bowl, a straining element in the bowl in spanning relation to said spout, the straining element having a cutting edge by which a piece of fruit can be divided into sections, and a removable protector for said cutting edge.

6. A juice extractor comprising a bowl having a spout, a perforated plate vertically disposed in the bowl in spanning relation to said spout with the upper edge of the plate forming a cutting edge by which a piece of fruit can be divided into sections.

7. A juice extractor comprising an extractor element, and means for mounting the element in a position offset from an axis for movement about the axis.

8. A juice extractor comprising a receptacle, an extractor element, and means for mounting the element in a position offset from an axis in the receptacle for movement about the axis.

9. A juice extractor comprising an extractor element, means for mounting said element for movement in an orbital path to cause the juice to be extracted from a piece of fruit held against the element during its movement, and means for collecting the extracted juice.

10. A juice extractor comprising an extractor element having an axis, and means for mounting the element for movement laterally with respect to said axis to cause said element to move circumferentially about its axis and relatively to a piece of fruit held against the element in response to said lateral movement.

Signed at Upland, in the county of San Bernardino and State of California, this 25th day of June, A. D. 1928.

ROBERT C. MORRIS.